Dec. 18, 1962    D. D. PETTIGREW ETAL    3,068,723
DRILL PRESS QUILL STOP
Filed Oct. 31, 1960    5 Sheets-Sheet 1

INVENTORS
DAVID D. PETTIGREW
EDWARD J. NIEHAUS, JR.
BY Strauch, Nolan & Neale
ATTORNEYS

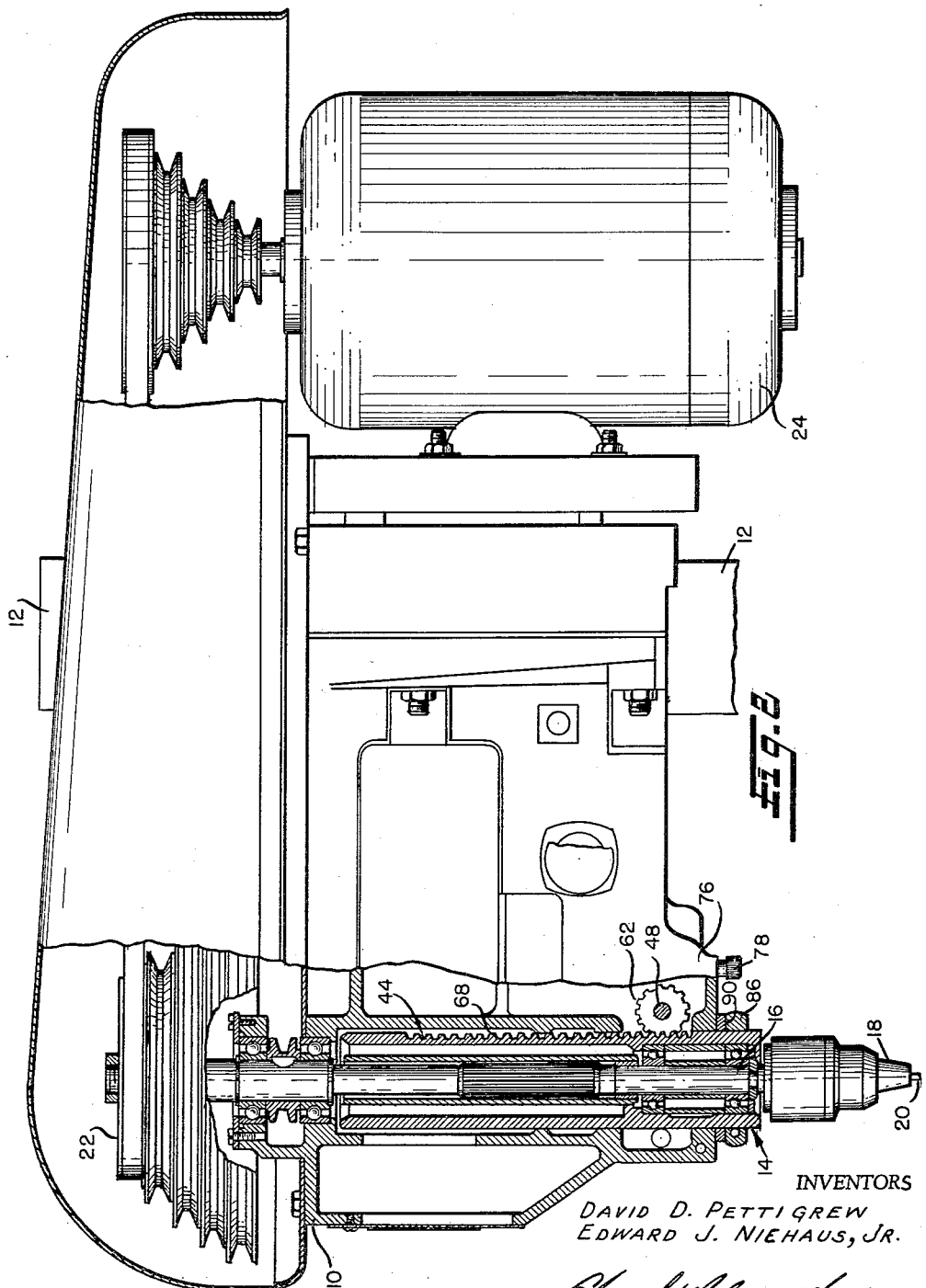

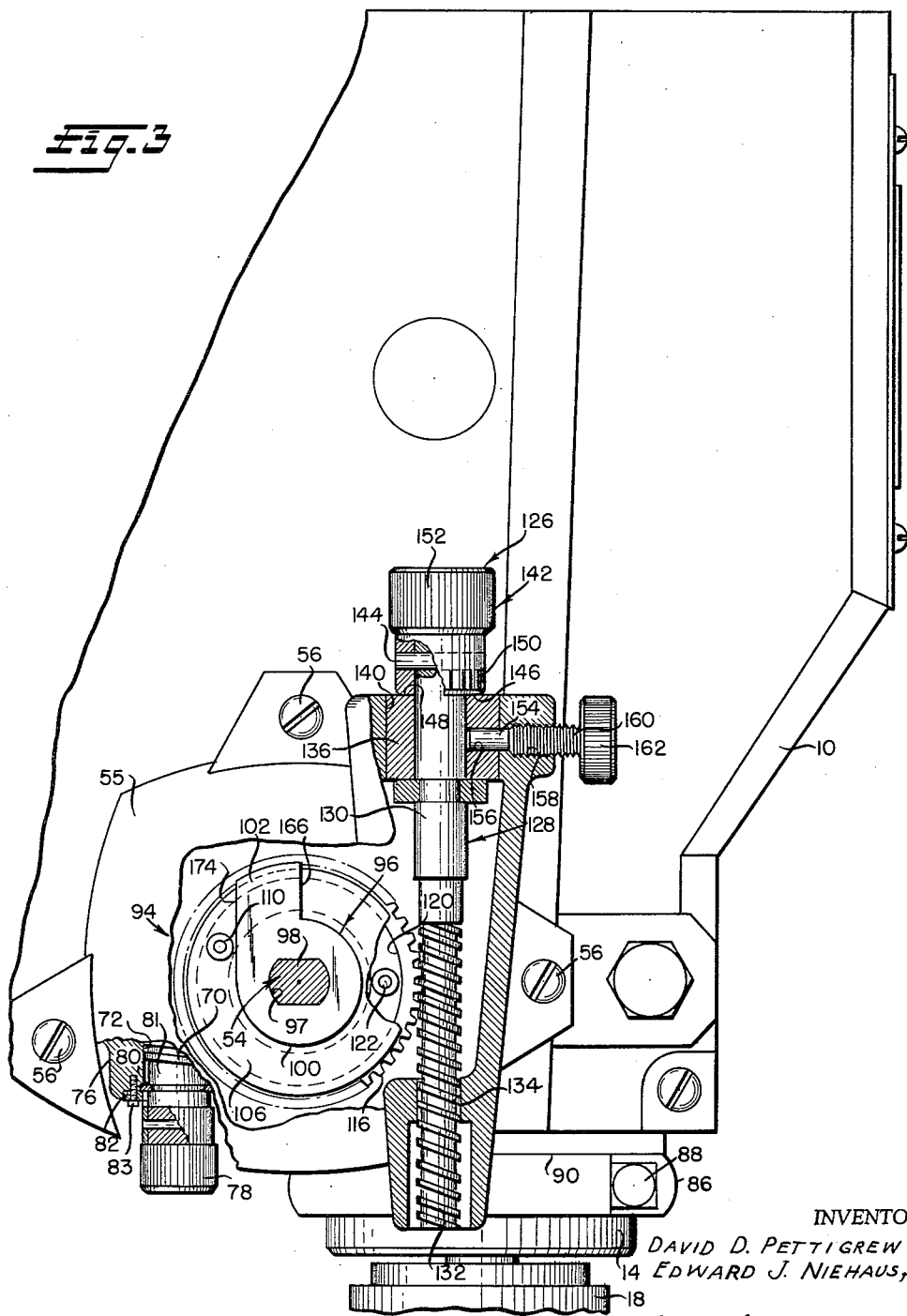

Dec. 18, 1962    D. D. PETTIGREW ETAL    3,068,723
DRILL PRESS QUILL STOP
Filed Oct. 31, 1960    5 Sheets-Sheet 4
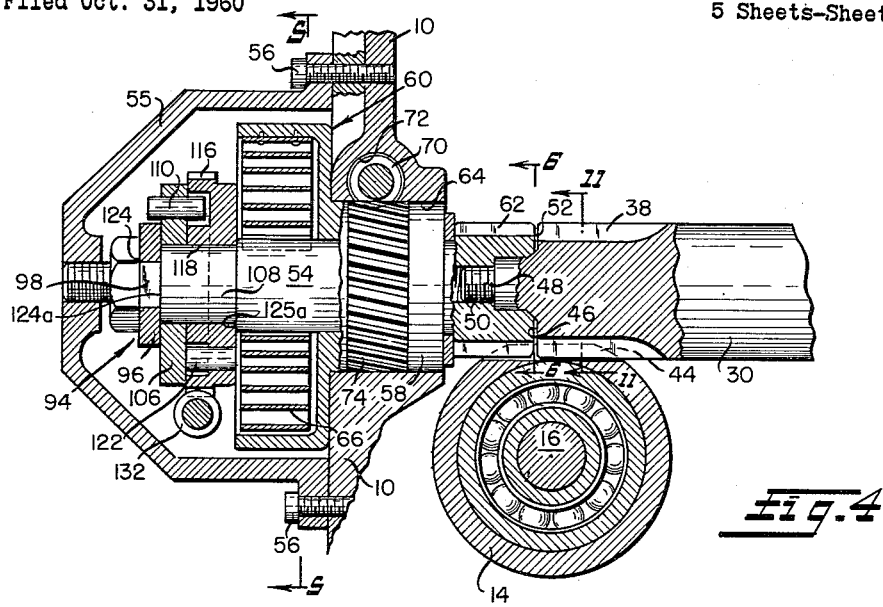
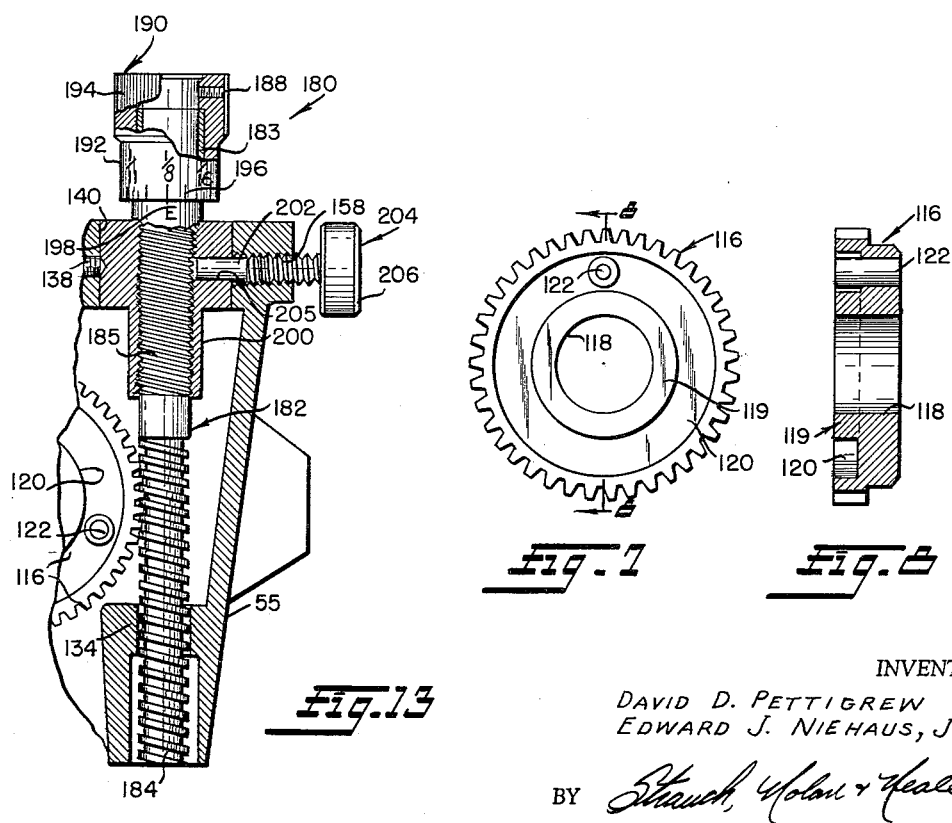
INVENTOR
DAVID D. PETTIGREW
EDWARD J. NIEHAUS, JR.
BY
ATTORNEYS Dec. 18, 1962   D. D. PETTIGREW ETAL   3,068,723
DRILL PRESS QUILL STOP
Filed Oct. 31, 1960   5 Sheets-Sheet 5

INVENTORS
DAVID D. PETTIGREW
EDWARD J. NIEHAUS, Jr.

BY Strauch, Nolan & Neale

ATTORNEYS

3,068,723
DRILL PRESS QUILL STOP
David D. Pettigrew and Edward J. Niehaus, Jr., Pittsburgh, Pa., assignors to Rockwell Manufacturing Company, Pittsburgh, Pa., a corporation of Pennsylvania
Filed Oct. 31, 1960, Ser. No. 66,334
22 Claims. (Cl. 77—34.5)

The present invention relates to improvements in cutting-depth adjustments for drill presses and like machine tools and is more particularly concerned with an adjustable tool feed stop mechanism for adjustably limiting the depth to which the working element of a machine tool, such as a drill in a drill press, is fed.

In the power machine art, it is the custom to provide drill presses and similar machine tools with tool feed stop mechanisms for adjustably limiting the depth of cut. Prior conventional drill press constructions and the like provide vertically shiftable rigid stops for arresting the downward movement of the reciprocally mounted drill press quill which rotatably carries the machine tool spindle. A typical stop mechanism of this prior type is disclosed in United States Patent No. 2,110,537 issued March 8, 1938 to H. E. Tautz wherein an upstanding screw threaded rod is rigidly clamped to the drill press quill in vertical parallel spaced apart relationship to the quill. An abutment nut threaded on the rod is rotatable thereon to different axially adjusted positions along the rod and cooperates with a stationary stop abutment formed rigid with the drill press head so that when the rod and nut are shifted downwardly by downward axial displacement of the quill, the nut abuttingly engages the stop abutment to prevent further downward movement of the quill and consequently of the cutting tool carried by the quill.

It will be readily appreciated that one of the more serious shortcomings of the foregoing type of drill press stop mechanisms is that when the displaceable stop member is forcibly moved into engagement with the stationary stop abutment, a canting force is exerted on the drill press quill with its attendant disadvantages. The canting force exerted on the drill press quill causes the hole in the work piece to be drilled out of round by causing the drill to be pulled to the side on which the stationary stop abutment is mounted. Also, such canting forces being eccentric to the longitudinal axis of the drill, promotes the possibility of breaking the drilling tool in the work-piece hole by pulling the tool to one side.

To reduce the magnitude of the canting forces exerted on the quill, the operator often slows down the rate of the descent of the quill as the stationary stop abutment is approached to reduce the impact produced by moving the nut forcible against the stationary abutment. It will be appreciated, however, that this procedure not only requires the particular care and attention of the operator, but further increases the drilling time for a particular operation with a resultant overall reduction in the productivity normally attainable with the machine.

In order to eliminate the exertion of the canting forces on the drill press quill with its attendant disadvantage without reducing the productivity attainable through normal operation of the drill press, it has been proposed to mount the displaceable stop member rigid with the rotatably mounted drill press feed pinion which is operable to reciprocate the quill through a rack and pinion drive. By arresting movement of the feed pinion to limit the downward feed stroke of the tool instead of directly arresting displacement of the quill itself, substantially no canting forces are exerted on the quill.

While these prior art proposals have been effective to eliminate the application of canting forces on the quill without slowing down the operation of the press, other problems are created which make these proposed constructions commercially impracticable for most drilling or boring operations. According to these prior proposals which directly arrest the rotation of the feed screw, the stop abutment is rigidly mounted for rotation with the feed screw to engage a stationary stop disposed in its circular path of movement so that the length of the stroke of the quill and consequently of the cutting tool is limited approximately to only one complete revolution of the feed screw. A further shortcoming of drill presses or the like embodying the prior art proposals wherein the rotation of the feed screw is directly arrested by a stop abutment mounted rigidly therewith, the quill is still movable in a downward or feed direction by a magnitude corresponding to the play or lost motion between the intermeshing teeth of the rack and gear connection drivingly coupling the feed screw to the quill. As a consequence, the accuracy of the depth to which the cutting tool is fed is correspondingly diminished and precision work cannot be readily accomplished in view of the indeterminable magnitude of the play between the intermeshing teeth of the rack and pinion drive connection which varies with wear and which permits the cutting tool to be fed further into the work after the stop position on the feed pinion is reached.

To overcome the foregoing difficulties experienced with the prior art constructions, the present invention contemplates the provision of a novel tool feed stop mechanism for a drill press or the like which does not directly arrest movement of either the rotatably driven feed pinion or the reciprocable tool carrying quill, but which directly and adjustably arrests rotation of a separate pinion member rotatable independently of the feed pinion and in constant biased driven meshing engagement with the rack carried by the quill. In accord with the present invention, the pinion member is biased to resiliently urge the teeth of the pinion member into snug abutment with teeth surfaces of the rack which are normally engaged by the feed pinion to retract the cutting tool from the work material and carries a special adjustable stop abutment assembly which is operable to arrest rotation of the pinion member and consequently the tool carrying quill. As a consequence of biasing the pinion member into snug abutment with the teeth surfaces of the quill rack, no play is present between the rack teeth and the pinion which would allow further tool feeding displacement of the quill after the stop position on the pinion member is reached. It will also be appreciated that by arresting rotation of the quill driven pinion member instead of the quill itself, the exertion of canting forces on the quill is substantially eliminated without reducing the normal speed of the quill in its tool feed cutting stroke.

The present invention further contemplates a novel adjustable stop abutment assembly for arresting rotation of a rotatably driven member which allows the driven member to be rotated through a maximum angular displacement of almost two or more complete revolutions, thus providing for a correspondingly increased axial tool feed stroke.

It is, accordingly, a principal purpose and object of the present invention to provide an improved tool feed stop mechanism for a drill press or similar machine tool which accurately limits the depth to which the cutting tool is fed and which provides for a more rapid operation of the press or machine tool without exerting any canting forces on the drill press quill.

Another major object of the present invention is to provide for an improved tool feed stop mechanism for a drill press or other similar machine tool having a reciprocably mounted tool carrying quill driven by a rotatably mounted feed pinion wherein the tool feed stroke of the quill is adjustably limited by arresting rotation of a member driven by the quill.

A further object of the present invention is to provide a tool feed mechanism as in the preceding object wherein a novel stop abutment assembly is provided for arresting rotation of the quill driven member and which provides for a maximum tool feeding stroke equivalent to at least approximately two full revolutions of the quill driven member.

A more specific object of the present invention is to provide an improved tool feed stop mechanism for a drill press or other similar machine having a reciprocably mounted tool carrying quill driven by a rotatably mounted feed pinion connected to the quill by a rack and pinion drive wherein a special stop abutment assembly is operable to adjustably arrest rotation of a separate pinion member which is drivenly engaged with the quill and which is spring biased to abuttingly engage the teeth surfaces of the quill rack normally engaged by the feed pinion to eliminate play or lost motion between the pinion member teeth and the quill rack teeth to thereby prevent overrunning feeding movement of the quill beyond the adjusted stop position.

Still a further specific object of the present invention is to provide an improved adjustable tool feed stop mechanism according to the preceding object wherein the feed pinion carries a further pinion section meshing with the quill rack and wherein the pinion section forms a continuation of the feed pinion along a common rotational axis, but which is split from the feed pinion along a plane perpendicular to the common rotational axis of the feed pinion and pinion section to provide two separately and independently rotatable pinion tooth sets engaging the quill rack.

Still a further object of the present invention is to provide an improved micrometer adjustable tool feed stop mechanism for a drill press or similar machine which is of simple, durable and inexpensive construction and which is capable of easy manipulation.

Further objects of the invention will appear as the description proceeds in connection with the appended claims and the annexed drawings wherein:

FIGURE 2 is a partially sectioned right-hand elevation of the drill press shown in FIGURE 1 with the drill press head partially broken;

FIGURE 3 is an enlarged partially sectioned fragmentary left-hand elevational view of the drill press shown in FIGURE 1 with the stop mechanism cover plate partially broken away to show interior details of the stop mechanism with the parts thereof positioned for initiating a tool feed stroke of the drill press quill;

FIGURE 4 is a section taken substantially along lines 4—4 of FIGURE 1;

FIGURE 7 is an enlarged elevational view of one of the component parts of the stop mechanism illustrated in FIGURE 1;

FIGURE 8 is a section taken substantially along lines 8—8 of FIGURE 7;

Figure 1:
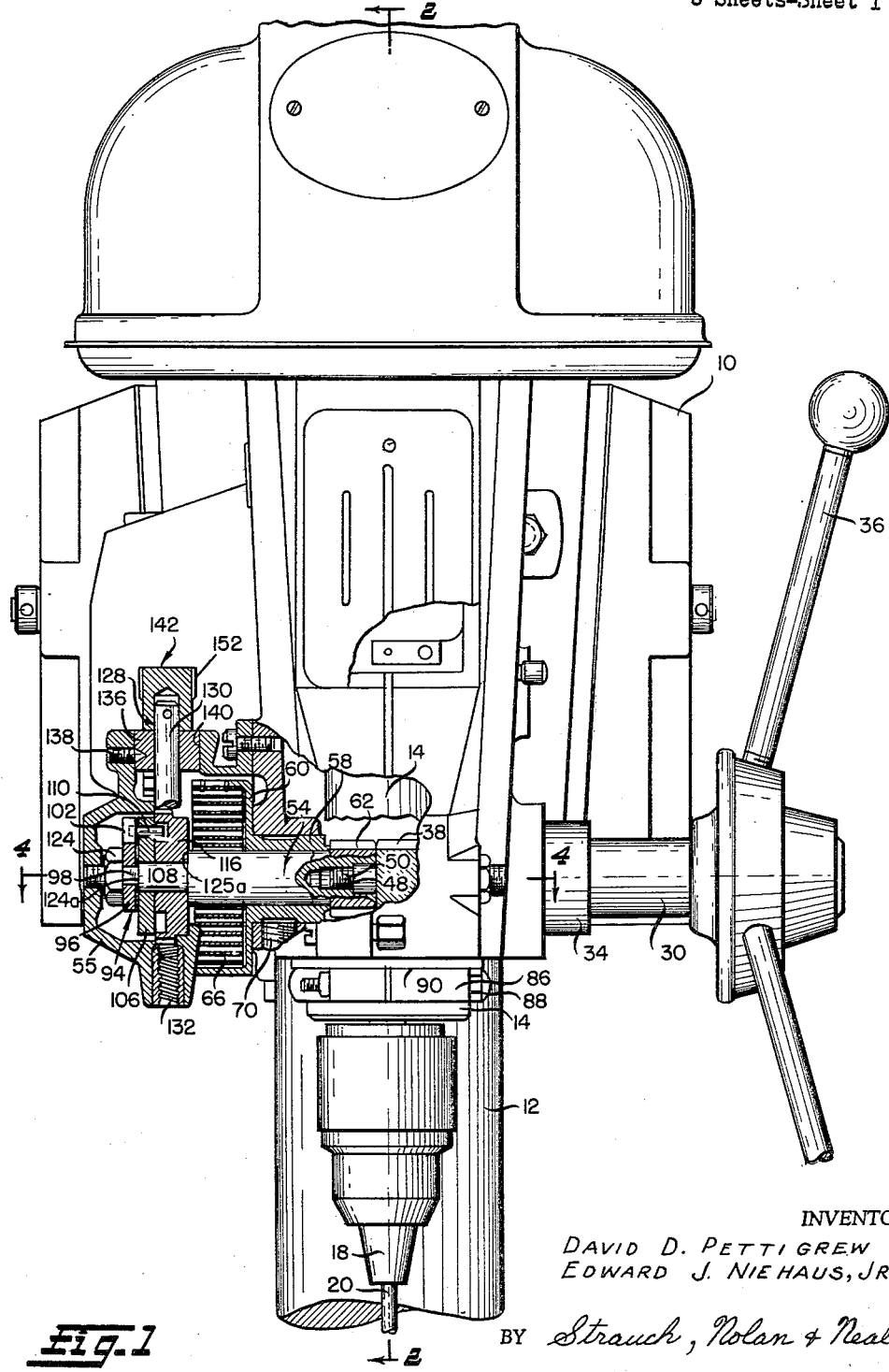
FIGURE 1 is a partially sectioned front elevational view showing a drill press according to a preferred embodiment of the present invention, and with the drill press head partially broken away to show interior details of the drill press quill stop mechanism.

Referring now to the drawings and more particularly to FIGURES 1 and 2, wherein the construction embodying the principles of the present invention are shown, the reference numeral 10 generally designates a hollow drill press head mounted over a work supporting table (not shown) by means of a rigid upright column 12. Slidably mounted in head 10 is a vertical reciprocable quill 14 in which a drill spindle 16 is conventionally journalled but axially retained for axial displacement together with quill 14. Spindle 16 carries at its lower end a chuck 18 within which a drill 20 or other tool is held over the work material (not shown) mounted on the work supporting table (not shown). Drill spindle 16 is rotatably driven through a conventional belt drive and pulley assembly 22 located within drill head 10 by a rear mounted electric motor 24 (FIGURE 2).

With reference now to FIGURES 1, 2 and 4, quill 14 is axially reciprocated by means of a horizontally extending drive shaft 30 which is journalled in and extends through a generally cylindrical boss 34 (FIGURE 1) formed integral with drill head 10. A handle 36 fixedly secured to the outer end of drive shaft 30 extending beyond boss 34 is manually manipulatable to rotate shaft 30.

As shown in FIGURES 1 and 4, the inner end of shaft 30 extending into drill press head 10 carries a pinion 38 which is preferably formed integral with shaft 30 and which meshes with the right-hand portion of a vertical rack 44 carried by quill 14. As viewed from FIGURE 4, the left-hand end face of shaft 30 immediately adjacent to pinion 38 has a planar surface 46 normal to the rotational axis of shaft 30 and is provided with a threaded coaxial piloting extension 48 protruding axially from surface 46. Extension 48 is loosely screw threaded into an axially tapped bore 50 formed inwardly of the end face 52 of a shaft 54 to allow for relative rotational movement between shafts 30 and 54 and to rotatably support the inner end of shaft 30. Shaft 54 is journalled for rotation about an axis common with that of shaft 30 in a cup-shaped cover member 55 removably secured to drill head 10 as by machine screws 56 and rotatably extends through a hub section 58 of a hollow spring casing 60 concentrically surrounding shaft 54.

Fixedly secured to the inner end of shaft 54 extending beyond hub section 58 and adjacent to end face 52, as shown in FIGURE 4, is a pinion section 62 which is in constant meshing engagement with the left portion of rack 44. The teeth and pitch of pinion 62 are identical to that of pinion 38 to generally form a continuation of pinion 38.

With continuing reference to FIGURES 2 and 4, end face 52 is planar and perpendicular to the common rotational axis of shafts 30 and 54 in parallel relationship to surface 46 and the depth of bore 50 is greater than the axial length of extension 48. By this construction, extension 48 is constantly loosely threaded into bore 50 within the range of axial displacement of quill 14 to rotatably support the left-hand end of shaft 30 and to allow unbinding independent rotation of shaft 54 relative to shaft 30.

Figure 5:
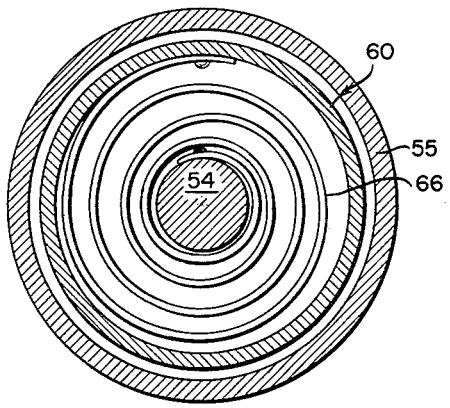
FIGURE 5 is a section taken substantially along lines 5—5 of FIGURE 4.

With reference to FIGURES 2, 4 and 5, the spring casing hub section 58 is freely rotatably supported in a smooth horizontal bore 64 formed in drill press head 10. A spiral coiled clock-type spring 66 received in casing 60 is mounted in surrounding relationship to shaft 54 and, as best shown in FIGURE 5, has its inner end fixedly secured to shaft 54 and its outer end fixedly secured to the interior smooth cylindrical wall of casing 60 which is concentrically spaced from the periphery of shaft 54. Spring 66 is spirally wound from its inner end to its outer end in a clockwise direction, as viewed from FIGURE 5, so that counterclockwise rotation of shaft 54 winds up and energizes spring 66.

Figure 6:
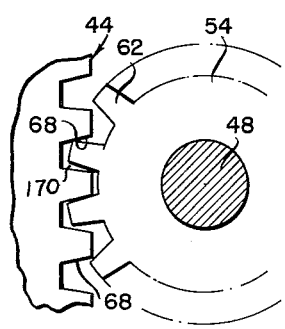
FIGURE 6 is a section taken substantially along lines 6—6 of FIGURE 4.

By means of this construction, shaft 54 is biased in a clockwise direction as viewed in FIGURE 5 to continuously resiliently urge the teeth of pinion section 62 into abutting and snug contacting engagement with the downwardly facing inclined surfaces of teeth 68 on rack 44 as best shown in FIGURE 6. Thus, when shaft 30 is rotated in a counterclockwise direction to displace quill 14 downwardly, rack 44, having its teeth 68 abuttingly engaging the teeth of pinion 54 against the bias of spring 66, rotates shaft 54 in a counterclockwise direction, as viewed from FIGURE 6. By rotating shaft 54 in a counterclockwise direction as viewed from the position of the parts shown in FIGURE 5, spring 66 is energized and when handle 36 is released by the operator, the energy stored in spring 66 is imparted to rotate shaft 54 in a clockwise direction to thereby axially shift quill 14 upwardly to a predetermined retracted position shown in FIGURES 1–3.

As shown in FIGURES 3 and 4, the tension of spring 66 is adjustable by means of a worm screw 70 freely received in a cylindrically smooth vertical bore 72 generally tangentially intersecting bore 64 in drill press head 10. Worm screw 70 engages a circumferentially threaded worm wheel section 74 formed in the outer periphery of spring casing hub section 58 so that manipulation of worm screw 70 causes spring casing 60 to be selectively rotated in opposite directions about shaft 54 in bore 64. By retaining shaft 54 stationary and by rotating casing 60 about shaft 54, the tension of spring 66 is thereby adjusted to a selected value.

With continued reference to FIGURE 3, worm screw 70 is shown to extend vertically downwardly through an apertured boss 76 formed integral with drill press head 10. Worm screw 70 carries at its lower end extending beyond boss 76 a knob 78 manipulatable by the operator to rotate worm screw 70 in one direction or the other. Worm screw 70 is axially retained in position by means of a retainer ring 80 received in an annular groove formed in a smooth cylindrical shank portion 81 of worm screw 70 and fixedly mounted in place by means of a collar 82 which is secured to boss 76 as by screws 83. By this construction it will be appreciated that worm screw 70 is free to be turned to rotate casing 60 in one direction or the other to thereby selectively adjust the tension of spring 66 as hereinbefore described. The binding engagement of worm screw 70 with worm wheel section 74 non-rotatably locks casing 60 in its adjusted position and holds casing 60 rigid with head 10 so that shaft 54 is rotatable relative to casing 60 thereby allowing spring 66 to be tensioned by rotation of shaft 54 in a counterclockwise direction and to release the stored spring energy for rotating shaft 54 in a clockwise direction as viewed from FIGURE 5.

The upper retracted position occupied by quill 14 in the drawings is limited by a split collar 86 (FIGURES 1 and 2) fixedly secured by means of a nut and bolt assembly 88 to the outer periphery of quill 14. In the fully retracted position of quill 14, collar 86 engagingly abuts the underside of head 10 which is provided with a planar abutment surface 90 to prevent further upward movement of quill 14. The upper retracted position of quill 14 is adjustable by vertically repositioning collar 86 on quill 14.

In order to adjustably limit the downward movement of quill 14, a stop assembly 94 (FIGURES 1 and 4) is provided for in accordance with the present invention and comprises a rigid flat-sided finger plate 96 having, as shown in FIGURE 3, a central non-circular flat-sided aperture 97 by which plate 96 is non-rotatably mounted on a reduced diametered squared section 98 of shaft 54.

With continued reference to FIGURE 3, plate 96 has a generally circular body portion 100 and a finger portion 102 extending tangentially from the outer periphery of body portion 100 and contained in a common plane with body portion 100 for rotation in a concentric path about the rotational axis of shaft 54.

Positioned axially to the right of plate 96, as viewed from FIGURES 1 and 4, is a flat-sided annular plate 106 which is freely rotatably mounted on a cylindrically smooth reduced diametered intermediate section 108 of shaft 54 and has a rigid axially extending pin 110 fixedly secured thereto approximately midway between the inner and outer peripheries thereof. Pin 110 protrudes axially beyond the opposed flat-sided surfaces of plate 106 at both sides thereof and is rotatable with plate 106 in a concentric path about the rotational axis of shaft 54. The left-hand end of pin 110, as viewed from FIGURES 1 and 4, extends into the rotational path of finger portion 102 so that rotation of plate 96 with shaft 54 swings finger portion 102 into abuting engagement with pin 110.

Axially adjacent to plate 106 is a gear 116 (FIGURES 1 and 4) having a smooth cylindrical bore 118 by which it is freely rotatably mounted on shaft section 108. Gear 116, as best shown in FIGURES 7 and 8, is provided with a smooth planar side face 119 extending perpendicularly to the rotational axis of shaft 54 and an annular groove 120 which is formed in side face 119 to freely slidably receive the right-hand protruding end of pin 110. An axially extending pin 122 fixedly secured to the body of gear 116 projects through groove 120 and terminates flush with gear face 119, thereby extending into the rotational path of the portion of pin 110 projecting into groove 120.

As shown in FIGURES 1 and 4, collar nut 124 received on a threaded end section of shaft 54 is tightened to axially abut plate 96 against annular shoulder 124a for holding plate 96, plates 106 and gear 116 are held axially in place against an annular shoulder 125a formed integral with shaft 54.

By means of the foregoing stop plate construction, it will be appreciated that finger portion 102 of plate 96 is swingable by rotation of shaft 54, in either direction to abuttingly engage pin 110 thereby advancing plate 106 to rotate with plate 96 and shaft 54. As plate 106 is rotated with plate 96, the portion of pin 110 protruding into groove 120 is advanced ino abutting engagement with pin 122 on gear 116 which is held stationary by means as will be presently described.

In accordance with the present invention, the angular position of pin 122 is adjustable by rotating gear 116 to a fixed position on shaft 54 so that when pin 110 abuts pin 122, rotation of shaft 54 is forcibly arrested. This is accomplished by providing for a manual adjusting mechanism 126 which comprises, as best shown in FIGURES 1 and 3, a vertically extending shaft 128 having a smooth cylindrical shank section 130 and a worm screw 132 in constant meshing engagement with gear 116. The lower end of worm screw section 132 is rotatably received in a smooth cylindrical bore 134 formed in cover member 55. The upper end of shank section 130 extends through and is journalled in a sleeve 136 which is fixedly secured by means of a set screw 138 (FIGURE 1) in a bore 140 formed in cover member 55 in alignment with bore 134.

With continued reference to FIGURES 1 and 3, shaft 128 is rotated by means of a knob 142 which is fixedly secured as by a pin 144 to the upper end of shank section 130 extending upwardly beyond the top surface of cover member 55. The bottom surface of knob 142 is provided with a smooth planar bottom face 146 in rotational surface abutting contact with the smooth end face 148 of sleeve 136. Suitable indicia 150 may be provided around the skirt of knob 142 which cooperate with a scribe line (not shown) formed on sleeve 136 to determine the angular displacement of shaft 128 from a fixed reference point. To facilitate manual adjustment of knob 142, the knob is provided with an enlarged knurled section 152 which may be readily grasped by the operator's thumb and fore finger. By manipulation of knob 142, shaft 128 is rotated to cause rotation of gear 116, thereby angularly displacing pin 122 about the rotational axis of shaft 54.

In order to non-rotatably secure shaft 128 in an adjusted position, a cylindrical plug 154 (FIGURE 3) of suitable non-galling soft material, such as brass, is received in aligned horizontal bores 156 and 158 formed in sleeve 136 and cover member 55 respectively. Plug 154 is axially forced into binding contact with the periphery of shaft shank section 130 by a screw 160 which is threadedly received in bore 158 and which has an enlarged knurled head 162 extending beyond bore 158 for facilitating manual rotation thereof.

Thus, it will be appreciated that when shaft 128 is bindingly secured against rotational movement by insertion of plug 154 and by tightening screw 160, the threads of worm screw section 132 cooperatively engage with the teeth on gear 116 to lock gear 116 against rotation on shaft 54 thereby holding gear pin 122 in a fixed angularly adjusted position. When pin 122 is engaged by pin 110, rotation of plates 106 and 96 and, consequently, of shaft 54 is arrested. As a consequence of aresting rotation of shaft 54 by axially displacing pin 110 into abutting engagement with gear pin 122, axial displacement of quill 14 is arrested to prevent further movement of cutting tool 20.

From the foregoing description, it will be seen that with the components of stop assembly 94 occupying the positions shown in FIGURE 3, quill 14 is in its upper fully retracted position with collar 86 in abutment with surface 90 on drill press head 10. To feed cutting tool 20 into the work material (not shown), handle 36 is manipulated to rotate drive shaft 30 in clockwise direction, as viewed from the left side of the drill press as shown in FIGURE 3, to axially drive quill 14 through pinion 38 and rack 44 in a downward feeding stroke.

Figure 9:
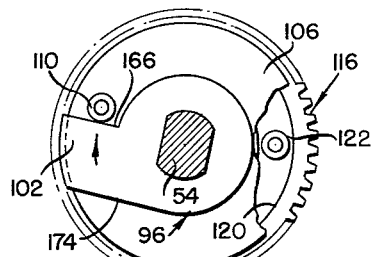
FIGURE 9 is a fragmentary left-hand end view of the stop mechanism similar to that shown in FIGURE 3, but with the parts of the stop mechanism in an intermediate position.
Figure 10:
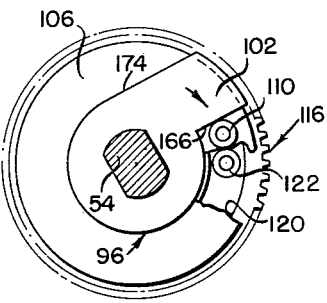
FIGURE 10 is a fragmentary left-hand end view of the stop mechanism shown in FIGURE 3 and similar to FIGURE 9, but with the parts shown in a quill stop position.

With continued reference to FIGURE 3, downward displacement of quill 14 drives shaft 54 in a clockwise direction through rack 44 and pinion section 62. By clockwise rotation of shaft 54, finger portion 102 of plate 96 is freely swung in a corresponding direction along its concentric path for a predetermined angular distance before abuttingly engaging pin 110 on plate 106. Prior to abutment of finger portion 102 with pin 110, plate 106, being freely mounted on shaft 54, remains stationary. When finger portion 102 is advanced into abutting engagement with pin 110, as shown in FIGURE 9, further rotation of shaft 54 produced by driving quill 14 in its downward feeding stroke, causes finger portion 102 to pick up pin 110 on its edge face 166 and advance plate 106 together with the rotation of plate 96. By rotating plate 106, pin 110 is slidably advanced in groove 120 until the adjusted stop position is reached, as shown in FIGURE 10, where pin 110 is brought into abutment with pin 122 on gear 116 which is held stationary by worm screw 132. Thus, by arresting clockwise rotation of plate 106, further rotation of plate 96 together with shaft 54 is prevented in a clockwise direction.

Figure 11:
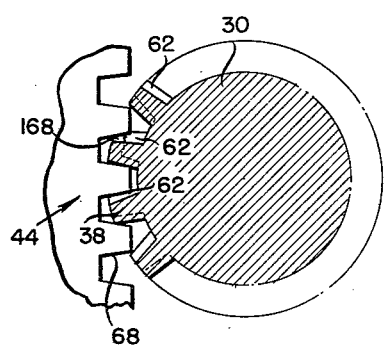
FIGURE 11 is a section taken substantially along lines 11—11 of FIGURE 4.

Since the teeth of pinion section 62 are biased by spring 66 into snug abutting engagement with the downwardly facing surfaces of teeth 68 on rack 44 as hereinbefore described, the prevention of further clockwise rotation of shaft 54, as viewed from FIGURES 3 and 10, directly arrests downward displacement of quill 14 without any intervening movement of quill 14 after the stop position is reached irrespective of the manufacturing tolerances between the teeth of pinion section 62 and rack teeth 68. To this end, it will be appreciated that the normal manufacturing tolerances between rack teeth 68 and the teeth of pinion section 62 provide for clearance spaces between the teeth of rack 44 and pinions 38 and 62 as indicated respectively at 168 (FIGURE 11) and 170 (FIGURE 6).

With the conventional stop mechanisms which are usually arranged to cooperatively engage and arrest rotation of the drive or feed shaft 30, shaft 30 is held against rotation when the stop position is reached, but as a result of the inertia of the downwardly moving drill press components, quill 14 continues its downward tool feeding travel beyond the stop position on shaft 30 until the downwardly facing surfaces of rack teeth 68 come into abutting engagement with the mating teeth surfaces on pinion 38. Further, when tool 20 is fed into the workpiece, the weight of quill 14 bearing against tool 20 is enough to cause tool 20 to move beyond the stop position of shaft 30. As a consequence, tool 20, in association with conventional shaft stop mechanisms, is fed beyond the designated stop position by a magnitude corresponding to the clearance 168 which cannot be readily determined or compensated for due to variations in manufacturing tolerances and also due to wear of the teeth resulting from usage of the machine.

With the present invention, however, the teeth of pinion 62 are biasingly held in snug abutment with the downwardly facing surfaces of rack teeth 68 so that when the rotation of shaft 54 is arrested by stop mechanism 94, as hereinbefore described, further movement of quill 14, and consequently of tool 20, beyond the stop position set by stop mechanism 94 is prevented. Further feeding movement of tool 20 due to the manufacturing tolerances between rack teeth 68 and pinion 62 is precluded since the bias of spring 66, which continually bears against quill 14, serves to oppose and overcome the inertia of the quill in its downward stroke thereby limiting advancement of the quill as soon as the stop position established by stop mechanism 94 is reached. Thus, the drilling depth is maintained within extremely close tolerances by eliminating the inaccuracies in drilling depths resulting from the manufacturing tolerances existing between rack teeth 68 and pinion 54.

By adjusting the position of gear pin 122 to different fixed angular positions about shaft 54, the lower feed stroke limit of quill 14 and consequently cutting tool 20 is correspondingly varied. From the position of the components of stop assembly 94 shown in FIGURE 3, it will be appreciated that by manipulation of adjustment shaft 128, pin 122 is rotatable in a counterclockwise direction to decrease the magnitude of the tool feed cutting stroke and in a clockwise direction to increase the magnitude of the tool feed cutting stroke.

Directly arresting rotation of shaft 54 by advancing pin 110 into abutment with stationary gear pin 122, allows cutting tool 20 to be fed into the work material (not shown) at a normal speed without producing abnormal canting forces to be exerted on quill 14 as a result of forcibly bringing pin 110 into contact with pin 122.

After the feed stroke stop position is reached, a release of operative pressure on handle 36 allows the energy stored in spring 66 to return quill 14 to its original retracted position which is normally determined by the vertically adjustable position of collar 86 on quill 14. In returning quill 14 to its retracted position, shaft 54 is rotated by spring 66 in a counterclockwise direction, as viewed from FIGURE 3, to drive quill 14 upwardly in its retracting stroke. Upward displacement of quill 14 in turn drives shaft 30 to return shaft 30 and handle 36 to their original retracted positions.

By driving shaft 54 from the energy stored in spring 66, fingered portion 102 is swung freely in a counterclockwise direction as viewed from FIGURE 3, until its edge face 174 is brought into abutment wtih pin 110. At this point, continued rotation of shaft 54 causes finger portion 102 to pick up pin 110 and advance place 106 in a counterclockwise direction, thereby moving the portion of pin 110 disposed in groove 120 in its concentric path until collar 86 abuts surface 90 of drill press head 10.

Figure 12:
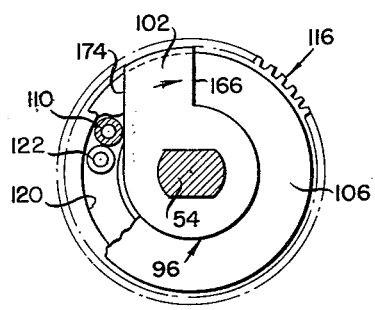
FIGURE 12 is a fragmentary left-hand end elevation of the stop mechanism as shown in FIGURES 3, 9 and 10, but with the parts shown in a position to provide for a maximum tool feed stroke of the drill press quill; and, FIGURE 13 is a sectioned elevation of a modified form of the adjustment apparatus for the stop mechanism of FIGURE 1.

In order to adjust stop assembly 94 to provide for a maximum tool feed stroke, the component parts are moved to the positions occupied in the drawings and as best shown in FIGURE 12. With continuing reference to FIGURE 12, it will be seen that pin 122 has been rotated in a clockwise direction to a position immediately adjacent to pin 110 and that the abutment edge 174 of finger portion 102 contacts or is in the near proximity of pin 110.

By now driving shaft 54 in a clockwise direction by downward displacement of quill 14, finger portion 102 and shaft 54 are displaceable, before abutment edge 166 is brought into contact with pin 110, through an angular distance of one complete revolution less the circumferential thickness of finger portion 102 and pin 110 measured along a circular line passing through the center of pin 110 in concentric relationship with the rotational axis of shaft 54.

Further advancement of pin 110 upon engagement by abutment edge 166 of finger portion 102 is effected by rotation of shaft 54 through a further angular distance of one complete revolution less the circumferential thickness of pin 122 before pin 110 is brought into abutment with the diametrically opposite point on stationary gear pin 122. As a consequence, it will be appreciated that the stop assembly 94 according to the present invention, allows a maximum cutting tool feed stroke having a magnitude corresponding to approximately two full revolutions of shaft 54. More accurately stated, the maximum tool feed stroke has a magnitude which corresponds to two revolutions of shaft 54 less the combined circumferential thicknesses of finger portion 102 and of pins 122 and 110, all measured along a circular line passing through the centers of pins 110 and 122.

As a consequence, the maximum permissible cutting stroke of tool 20 is correspondingly increased to permit a greater number of varied operations to be accomplished with the drill press thereby appreciably improving the utility of the machine while at the same time attaining the attendant advantages of directly arresting movement of shaft 54 instead of quill 14 as hereinbefore explained.

Where it is desired to provide for a maximum angular displacement of shaft 54 that exceeds two revolutions, a plurality of plates having a construction similar to plate 106 may be provided for in place of the single plate 106. Thus, it will be appreciated that an additional plate having a construction similar to plate 106 may be mounted on shaft 54 between plate 106 and gear 116 to abuttingly couple with pin 122 and pin 110 and to thereby provide for a maximum angular displacement of shaft 54 of almost three revolutions.

It will be appreciated that stop assembly 94 may be mounted on a quill drive shaft of a conventional cross-shaft construction where it is desired to ignore the problem of backlash produced by the tolerances between the drive shaft pinion and the teeth of the drill press quill rack.

In a modified form of the adjustment for gear pin 122, a micrometer mechanism 180 is shown in FIGURE 13 to replace adjusting mechanism 126. Like reference numerals in the embodiments of FIGURES 1–12 and FIGURE 3 identify the same parts.

Micrometer mechanism 180 comprises a vertically extending shaft 182 having a smooth cylindrical shank section 183, a worm screw section 184 and an intermediate threaded section 185 axially between sections 182 and 184. Worm screw 184 is in constant meshing engagement with the teeth of gear 116 and the lower end of worm screw section 184 is freely rotatably received in bore 134 of cover member 55. The upper end of shank section 183 projects beyond an internally threaded sleeve 200 member in cover member bore 140 and has fixed thereto by means of a set screw 188 a manipulating knob 190. Knob 190 is formed with a skirt 192 and an enlarged knurled end section 194 which may be readily grasped by the operator to turn the shaft 182.

Suitable indicia 196 provided around the periphery of skirt 192 cooperates with a vertically extending scale 198 formed on sleeve member 200 which projects through and which is secured in bore 140 by screw 138 (FIGURE 1) as hereinbefore described.

Sleeve member 200 surrounds shaft 182 in engagement with threaded section 185. The upper end of sleeve member 200 projects beyond the top face of body member 55 and extends into knob 190 between skirt 192 and shank section 183. In order to non-rotatably secure vertically extending shaft 182 in place, a cylindrical plug 202 of suitable non-galling soft material, such as brass, is received in the aligned horizontal bores 205 and 158 of sleeve 200 and cover member 55 respectively. Plug 202 is axially forced into binding contact with the outer periphery of intermediate threaded section 185 by a screw 204 which is threadedly received in bore 158 and which has an enlarged knurled head 206 extending beyond bore 156 to facilitate manual rotation thereof.

By means of this construction, manipulation of knob 190 concomitantly rotates and axially displaces shaft 182 along the axially fixed internally threaded sleeve member 200 which is held in place by screw 138.

Thus, it will be appreciated that by turning knob 190, gear 116 is rotated in either direction about the axis of shaft 54 so as to angularly shift pin 122 to a desired position for limiting the downward displacement of quill 14. Pin 122 is held in its adjust position by the binding threaded engagement of shaft section 185 with pin 202.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Feed means for moving a cutting tool carried by a reciprocating rotating driven member to advance said driven member in a tool feeding direction, said feed means comprising a drive member coupled to said driven member, a yieldably biased member mounted for rotation relative to said drive member and drive connected to said driven member independently of said drive member, said biased member being operable to continually urge said driven member in a tool retracting direction and to be driven by displacement of said driven member in a tool feeding direction, and adjustable stop means operatively arranged to engage and hold said biased member against angular displacement in a direction corresponding to tool feeding movement of said driven member upon predetermined tool feeding advancement of said driven member, said biased member being operable to arrest tool feeding movement of said driven member when held against angular displacement by said stop means.

2. The feed means as defined in claim 1, wherein means are provided for mounting said biased member and said driving member for rotation about a common axis.

3. Feed means having a support frame and comprising: a rack mounted for longitudinal reciprocal movement in said frame and a working tool attached to said rack to be moved through longitudinally opposed feeding and retracting strokes by reciprocation of said rack, a drive shaft mounted for rotation in said frame and having gear means in meshing engagement with said rack for longitudinally displacing said rack upon rotation of said drive shaft; a stop shaft mounted for rotation in said frame freely of said drive shaft and having gear means in constant meshing engagement with said rack independently of said drive shaft gear means, said rack being operable upon tool feeding displacement thereof to drive said stop shaft in a predetermined direction, yieldable means biasing said stop shaft gear means into snug abutting engagement with predetermined surfaces of said rack to continually urge said rack in a tool retracting direction, and adjustable stop means operatively arranged to engage and hold said stop shaft against angular displacement in a direction corresponding to tool feeding movement of said rack upon a predetermined tool feeding advancement of said rack, said stop shaft gear means being operable in abuttingly engaging with said predetermined rack surfaces to arrest tool feeding movement of said rack when the stop position on said stop shaft is reached.

4. The feed means as defined in claim 3, wherein means are provided for rotatably supporting said stop shaft and said drive shaft along a common rotational axis.

5. The feed means as defined in claim 3, wherein said stop shaft is provided with means for rotatably supporting said drive shaft at one end thereof.

6. The feed means as defined in claim 3, wherein said stop shaft is provided with an axially tapped bore and said drive shaft is provided with an axially protruding member loosely threadedly engaged in said bore for facilitating relative rotation of said stop shaft and said drive shaft about a common rotational axis, and wherein said gear means of said drive shaft and said stop shaft respectively comprise pinions engaging said rack in side by side coaxial relationship.

7. The feed means as defined in claim 3, wherein said yieldable means comprises a spring casing freely rotatably mounted in said frame in surrounding relationship to said stop shaft, means for rotating said casing to an adjusted fixed position in said frame, a helically wound spring reacting between said casing and said stop shaft and being effective to have energy stored therein by rotation of said stop shaft in a direction corresponding to tool feeding movement of said rack and to release energy stored therein to rotate said stop shaft for effecting return of said rack to a predetermined tool retracted position.

8. The feed means as defined in claim 7, wherein circumferential worm threads are provided on said casing and a manipulatable worm is rotatably mounted in said frame in constant meshing engagement with said threads for selectively rotating said casing in opposite direction about said stop shaft to a bindingly fixed angular position relative to said stop shaft for adjusting the tension of said spring.

9. The feed means as defined in claim 3, wherein said drive shaft has a manually manipulatable handle fixedly secured thereto.

10. The feed means as defined in claim 3, wherein said stop means comprises a rigid stop member fixedly mounted for rotation with said stop shaft, a rigid stop abutment adjustable to a stationary angular position relative to said stop member in spaced apart relationship thereto, and rigid means abuttingly engageable by said stop member to rotate therewith and operable upon predetermined angular displacement of said stop shaft to abuttingly engage said stop abutment and to hold said stop shaft against further angular displacement.

11. In combination with a machine for rotating a cutting tool and simultaneously moving the tool axially through feeding and retracting strokes, and having a reciprocally mounted rack having said tool attached thereto for longitudinally moving said tool through opposed feeding and retracting strokes, a rotatable drive shaft having a pinion member in meshing engagement with said rack with a predetermined tolerance between the teeth of said pinion member and the teeth of said rack, means for rotating said drive shaft to advance said rack in a tool feeding direction, a stop shaft mounted for rotation relative to said drive shaft and having a pinion member in constant meshing engagement with said rack independently of said drive shaft pinion member and with a predetermined tolerance between the teeth of said stop shaft pinion member and the teeth of said rack, adjustable rigid stop means arranged to engage and hold said stop shaft against rotation in a direction corresponding to tool feeding movement of said rack upon predetermined displacement of said rack in a tool feeding direction and yieldable means continuously biasing said stop shaft pinion member into snug abutting engagement with predetermined surfaces of the teeth of said rack for constantly urging said rack in a tool retracting direction whereby displacement of said rack is arrested as soon as said stop shaft is held against rotation by said stop means irrespective of the tolerances between the teeth of said pinion members and the teeth of said rack.

12. In combination, a rotatable drive member, a rotatable driven member drive connected to said drive member through a one way drive connection and rigid stop abutment means mounted on said driven member for adjustably and positively limiting the angular displacement of said drive member within a predetermined range having a maximum limit in excess of one and one-half revolutions of said drive member.

13. A stop mechanism for limiting the angular displacement of a rotatable member in a predetermined direction, comprising a first rigid stop member fixedly mounted for rotation with said rotatable member in a path encircling said rotatable member, a rigid stop abutment spaced from the rotational path of said stop member and selectively adjustable to fixed predetermined positions in a path encircling said rotatable member for varying the angular distance through which said rotatable member is freely displaceable, and rigid means abuttingly movable by displacement of said stop member and operable upon predetermined displacement with said stop member to engage said stop abutment and hold said rotatable member against further rotation.

14. A stop mechanism for limiting the angular displacement of a rotatable driven member in a predetermined direction, said mechanism comprising two spaced apart rigid stop members extending parallel to the rotational axis of said driven member for rotation in closed paths which are spaced apart axially along said driven member, means for fixedly securing one of said stop members to said driven member for rotation therewith, means for mounting the other of said stop members for free rotation relative to said driven member and for rotating said other stop member to a selected fixed angular position independently of the movement of said driven member, and rigid means movable by abutment with and displacement with said one stop member to abuttingly engage said other stop member, said other stop member being operable to arrest rotation of said driven member by abutment with said rigid means upon predetermined concomitant displacement of said rigid means with said one stop member.

15. A stop mechanism for limiting the angular displacement of a rotatably driven member in a predetermined direction, said mechanism comprising a rigid stop member fixedly mounted for rotation with said driven member in a path encircling said driven member, a rigid stop abutment mounted for rotation independently of said driven member in a path encircling said member and axially spaced apart from said stop member, means for rotating said stop abutment to a selected fixed angular position in its rotational path, and a rigid member mounted for free rotation on said driven member in a path encircling said driven member and having axially extending means projecting into the rotational paths of both said stop abutment and said stop member for separable abutting engagement with said stop member and said stop abutment.

16. A stop mechanism for limiting the angular displacement of a rotatably driven member in a predetermined direction, said mechanism comprising a rigid stop member fixedly mounted for rotation with said driven member in a concentric path encircling the rotation axis of said driven member, a stop abutment rotatably mounted on said driven member in axially spaced apart relationship to said stop member for movement in a concentric path encircling the rotational axis of said driven member, adjustment means for selectively rotating said stop abutment to a fixed angular position in its rotational path, and rigid abutment means mounted for free concentric rotation on said driven member in the rotational paths of both said abutment member and said stop member and being operable to be engaged and angularly displaced by said stop member upon rotation of said driven member until said abutment means engages said abutment stop, said stop abutment being operable to arrest rotation of said driven member by abutting engagement with said abutment means upon advancement of said abutment means concomitantly with said stop member.

17. A stop mechanism for limiting the angular displacement of a rotatably driven shaft in a predetermined direction, comprising a first plate member fixedly secured to said shaft and having a protruding finger portion rotatable in a path concentric to the rotational axis of said shaft, a gear mounted for free rotation on said shaft in axially spaced apart relationship with said first plate and said finger portion, means forming an axially extending groove in the side of said gear facing said first plate in concentric relationship with said shaft rotational axis, a pin fixedly secured to said gear and extending into said groove, adjustment means operatively engaging said gear for rotating said gear to angularly displace said pin to a selected fixed angular position, a second plate mounted for free rotation on said shaft between said gear and said first plate, a first axially extending pin portion rigid with said second plate and extending into the rotational path of said finger portion, a second axially extending pin portion rigid with said second plate and extending freely into said groove in the path of said pin, said finger portion being operable upon rotation of said spindle through a predetermined angular distance to abuttingly engage said first pin portion to cause said first and second plates to rotate together in a predetermined direction, said second pin portion being operable upon rotation of said second plate through a predetermined angular distance to abuttingly engage said pin and thereby cause the rotary movement of said shaft to be arrested.

18. The stop mechanism as defined in claim 17, wherein said pin portions are coaxially mounted on said second plate.

19. The stop mechanism as defined in claim 17, wherein said adjustment means comprises a manually rotatable worm screw in constant meshing engagement with said gear, and means for fixing said worm screw against rotation in selected adjusted position.

20. The stop mechanism as defined in claim 19, wherein said gear engages said worm screw to hold said worm screw against axial displacement.

21. The stop mechanism as defined in claim 19, wherein said worm screw is axially displaceable and has manually manipulatable micrometer adjustment means for rotating said worm screw.

22. A machine for moving a cutting tool longitudinally through opposed feeding and retracting strokes comprising a driven member mounting said tool, a first rotatable member operatively coupled to said driven member and operable upon rotation thereof in a predetermined direction to drivingly advance said driven member in a tool feeding direction, a second rotatable member operatively coupled to said driven member independently of said first member and rotatable relative to said first member, and adjustable stop means operatively arranged to engage and hold said second member against angular displacement in a direction corresponding to tool feeding movement of said driven member upon predetermined tool feeding advancement of said driven member, said second member being operable to arrest tool feeding movement of said driven member when held against angular displacement by said stop means.

References Cited in the file of this patent

UNITED STATES PATENTS

| 1,960,699 | Galloway | May 29, 1934 |
| 2,006,746 | Poole | July 2, 1935 |

FOREIGN PATENTS

| 512,341 | Great Britain | Sept. 1, 1939 |